United States Patent
Chao et al.

(10) Patent No.: US 8,811,775 B1
(45) Date of Patent: Aug. 19, 2014

(54) VISUALIZING DIGITAL IMAGES ON A MAP

(75) Inventors: Edward K. Chao, Sudbury, MA (US); Michael B. Herf, Studio City, CA (US); Lars D. Perkins, Wayland, MA (US); Reed P. M. Sturtevant, Lexington, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/621,036

(22) Filed: Sep. 15, 2012

Related U.S. Application Data

(60) Continuation of application No. 13/100,992, filed on May 4, 2011, which is a division of application No. 10/321,403, filed on Dec. 17, 2002, now Pat. No. 7,970,240.

(60) Provisional application No. 60/339,804, filed on Dec. 17, 2001.

(51) Int. Cl.
*G06K 9/00* (2006.01)

(52) U.S. Cl.
USPC .......................... 382/305; 382/306; 382/307

(58) Field of Classification Search
USPC ................................................ 382/305–307
See application file for complete search history.

(56) References Cited

U.S. PATENT DOCUMENTS

| | | | |
|---|---|---|---|
| 5,324,958 A | 6/1994 | Mead et al. | |
| 5,442,744 A | 8/1995 | Piech et al. | |
| 6,332,146 B1 | 12/2001 | Jebens et al. | |
| 6,332,149 B1 | 12/2001 | Warmus et al. | |
| 6,373,488 B1 | 4/2002 | Gasper et al. | |
| 6,389,181 B2 | 5/2002 | Shaffer et al. | |
| 6,449,639 B1 | 9/2002 | Blumberg | |
| 6,578,072 B2 | 6/2003 | Watanabe et al. | |
| 6,681,061 B2 | 1/2004 | Agata et al. | |
| 6,842,761 B2 | 1/2005 | Diamond et al. | |
| 6,883,146 B2 * | 4/2005 | Prabhu et al. | 715/854 |
| 6,950,989 B2 * | 9/2005 | Rosenzweig et al. | 715/721 |
| 7,020,848 B2 * | 3/2006 | Rosenzweig et al. | 715/855 |
| 7,054,481 B2 | 5/2006 | Lloyd-Jones | |
| 2001/0015733 A1 * | 8/2001 | Sklar | 345/853 |
| 2002/0049738 A1 | 4/2002 | Epstein | |
| 2002/0087546 A1 | 7/2002 | Slater et al. | |
| 2004/0205515 A1 | 10/2004 | Socolow et al. | |
| 2007/0244925 A1 * | 10/2007 | Albouze | 707/104.1 |

OTHER PUBLICATIONS

Non-Final Office action dated Feb. 6, 2012, issued in corresponding U.S. Appl. No. 13/100,992.

(Continued)

*Primary Examiner* — Wesley Tucker

(57) ABSTRACT

A computer based, digital image management system that visually presents an entire archive in a manner that facilitates easy, non-textual, searching for specific images. In one embodiment, the system includes two elements: a file management methodology and a graphical user interface. The file management method utilizes reference files that contain multiple properties (metadata) relating to each image file. Image files are grouped into a multiplicity of collections based on user-defined associations of the properties. The graphical user interface visually represents the groups of image files on 2-dimensional or 3-dimensional graphic metaphors. In addition, the graphical interface uses multiple display variables such as icons, mnemonics, size, movement, color, and luminance to signify relationships between groups, and/or communicate key properties of individual or groups of images.

28 Claims, 20 Drawing Sheets

(56) References Cited

OTHER PUBLICATIONS

Final Office action dated Jun. 6, 2012, issued in corresponding U.S. Appl. No. 13/100,992.
Non-Final Office action dated Sep. 5, 2012, issued in corresponding U.S. Appl. No. 13/100,992.
Final Office action dated Mar. 7, 2013, issued in corresponding U.S. Appl. No. 13/100,992.
Non-Final Office action dated Aug. 19, 2013, issued in corresponding U.S. Appl. No. 13/100,992.
Notice of Allowance dated Dec. 4, 2013, issued in corresponding U.S. Appl. No. 13/100,992.

* cited by examiner

Order Prints

Order photo-lab quality prints of your digital pictures.

1204

Try It Today!
- Easy and secure ordering
- Affordable prices and shipping
- High-quality glossy prints
- Mailed directly to you
- Only order the pictures you like
- Risk free guaranteed

*We Use* Kodak PAPER *Turn up the Color*

Sizes and Prices:

3.5x5 glossy prints      $0.29 each

4x6 glossy prints      $0.49 each ⟵ 1200

5x7 glossy prints      $0.99 each

8x10 glossy prints      $3.99 each

Wallet sized glossy prints      $1.79 each for 4

Shipping and Handling: ⟵ 1202
$1.49 for 1-19 prints
$2.49 for 20-39 prints
$2.99 for 40+ prints The total amount includes shipping and handling, and sales tax, where applicable. U.S. Postal Service ground shipping takes 5-7 business days.

Click Next to place your order.

[< Back]    [Next >]    [Cancel]    [Help]

FIG. 13

Order Prints

Step 3 of 6 - Credit Card and E-mail Confirmation
Enter your credit card and confirmation e-mail address.

Credit Card Information
Your credit card order is secure using SSL processing Card Type [American Express ▼]

Card Number [          ]

Exp. Month [01 ▼] Year [2002 ▼]

E-mail Confirmation

Enter your e-mail address, and we will send you an e-mail to confirm your order and to notify you when it ships.

E-mail Address [carrie@x.com]

Re-enter E-mail [          ]

Click Next to review your order.

[< Back] [Next >] [Cancel] [Help]

FIG. 15

Order Prints

Step 4 of 6 - Review and Submit Your Order
Review your order before submitting it and validating your credit card.

| Billing Address | Shipping Address | Credit Card Information |
|---|---|---|
| Carrie X<br>1xx Mechanic St.<br>Canton MA, 02021 | Nancy Y<br>xx Reynolds Drive<br>Meriden CT, 06450 | American Express<br>xxxx xxxxxx 52005<br>Expiration: 03/2006<br>E-mail<br>carrie@x.com |

| Description | Quantity | Unit Price | Subtotal Price |
|---|---|---|---|
| 3.5x5 Glossy Prints | 3 | $0.49 | $1.47 |
| 4x6 Glossy Prints | | | |
| 5x7 Glossy Prints | | | |
| 8x10 Glossy Prints | | | |
| Wallet Glossy Prints (4) | | | |

NET AMOUNT 1.47
Shipping and Handling 1.49
Sales Tax 0.00
TOTAL AMOUNT 2.96

U.S. Postal Service ground shipping takes 5-7 business days.

Click Next to confirm your credit card. Click Back to edit your order. Confirming your credit card may take a few seconds.

[< Back]  [Next >]    [Cancel]    [Help]

FIG. 16

Order Prints

Step 5 of 6 - Send Pictures
Send your pictures to the photo lab for print processing.

You are now ready to send up your pictures.
Your order has been received. Your order # is 521.

You have 3 pictures to send in your order.

On a 56k modem, the send process takes approximately 1 minutes.

You will receive an e-mail confirmation after the pictures are sent and your order is complete.

If your order fails, for any reason, the order will not be placed and your credit card will not be billed. You will need to place a new order.

Click Next to start sending us your pictures.
This might take a few minutes.
You will see a progress bar with the upload status.

[ <Back ]  [ Next> ]   [ Cancel ]   [ Help ]

FIG. 17

VISUALIZING DIGITAL IMAGES ON A MAP

CROSS-REFERENCE TO RELATED APPLICATIONS

The present application is a Continuation of U.S. patent application Ser. No. 13/100,992, filed on May 4, 2011 and entitled "Method and Apparatus for Archiving and Visualizing Digital Images", which is a Divisional of U.S. patent application Ser. No. 10/321,403, filed on Dec. 17, 2002 and issued as U.S. Pat. No. 7,970,240, which claims the benefit, under 35 U.S.C. §119(e), of U.S. Provisional Application No. 60,339,804, filed on Dec. 17, 2001, the contents of which are incorporated herein by reference.

FIELD OF THE INVENTION

The invention relates to digital image systems and, more particularly, to systems and method for archiving and visualizing digital images.

BACKGROUND OF THE INVENTION

The most common computer based digital image management methods have relied on hierarchical storage systems, wherein images are treated as files that exist in directories or folders, which are then contained in other directories. Search functions have required users to remember file and directory names. When the archive size is large, this method is difficult for most people.

Several methods have been used to improve the effectiveness of searching for specific images in a large hierarchical archive. Some rely on providing low resolution, or "thumbnail" previews of individual files or folders. Others rely on users to create and input key words that are tagged onto individual images. A search process using the key words can then be executed. Another method that has been proposed is to utilize image recognition techniques to identify key elements of each image. The elements are correlated to a set of key words, and a search process using the key words can then be executed.

All of these approaches seem more directed toward the convenience of the machine archiving the images (hardware and software), rather than toward the convenience of the user. None of them take full advantage of the extraordinary human facility for recognizing and manipulating images. A system and method that employs advanced visualization techniques to enable users to archive and retrieve images in a more natural fashion would therefore be highly desirable.

SUMMARY

A system and method in accordance with the principles of the present invention is directed to the storage, management, and retrieval of digital images. It represents an approach that is fitting with human cognitive processes and memory schemata.

Specifically, this concept leverages superb human capability for remembering events, people, and emotional context, as well as human preference for visual and spatial over textual and linguistic representations of information. The result is a digital photography file management system that allows users to easily find and retrieve specific image files from an archive with minimal prior organization efforts or textual inputs.

In a digital image management system in accordance with the principles of the present invention metadata are acquired, associated with, and stored along with one or more images. Metadata may fall into one or more of three general categories: characteristics of the environment, characteristics of the image's content, or characteristics of how a user has interacted with the image. The metadata are used to group images into collections that mimic human categorization schemes. Such collections thereby make it easier for human beings to remember and retrieve individual images and/or collections of images. An image may be grouped into a plurality of collections.

The collections may be displayed on a graphical metaphor that provides additional cues or information to facilitate the user's memory. Graphical metaphors may include a timeline, a map, family tree, a route plotted on a map, or other mnemonic classifying devices. Various combinations of graphical metaphors are also contemplated within the scope of the invention, for example, timeline and map metaphors may be combined. A timeline may be used to display and access images according to one or more dates associated with the image. The one or more dates may be the date that the image was first captured or the date the image was archived, for example. A map metaphor may be used to associated images with the geographical location of the image's location. A combination metaphor may superimpose one or more timelines on map locations to allow a user to, for example, conduct a graphical search for images taken within a specific range of time in various locations; Winter in Tahiti, Summer in Colorado, for example. A user, searching for a specific image, may employ one or more steps of isolating a small group of collections, then a specific collection, then the specific image within the collection. Individual images (or collections), again, based on metadata, may be presented in a manner to further communicate information about the image (or collections) or about the relationships between images (or collections).

In another aspect of the invention, a user may access archived images (using, for example, visual metaphors) and output the images in various ways. For example, a user may use a system in accordance with the principles of the present invention to select images for online photo processing, for local or remote printing, or for emailing.

BRIEF DESCRIPTION OF THE DRAWINGS

The above and further features, aspects, and advantages of the invention will be apparent to those skilled in the art from the following detailed description, taken together with the accompanying drawings in which:

Figure 13:
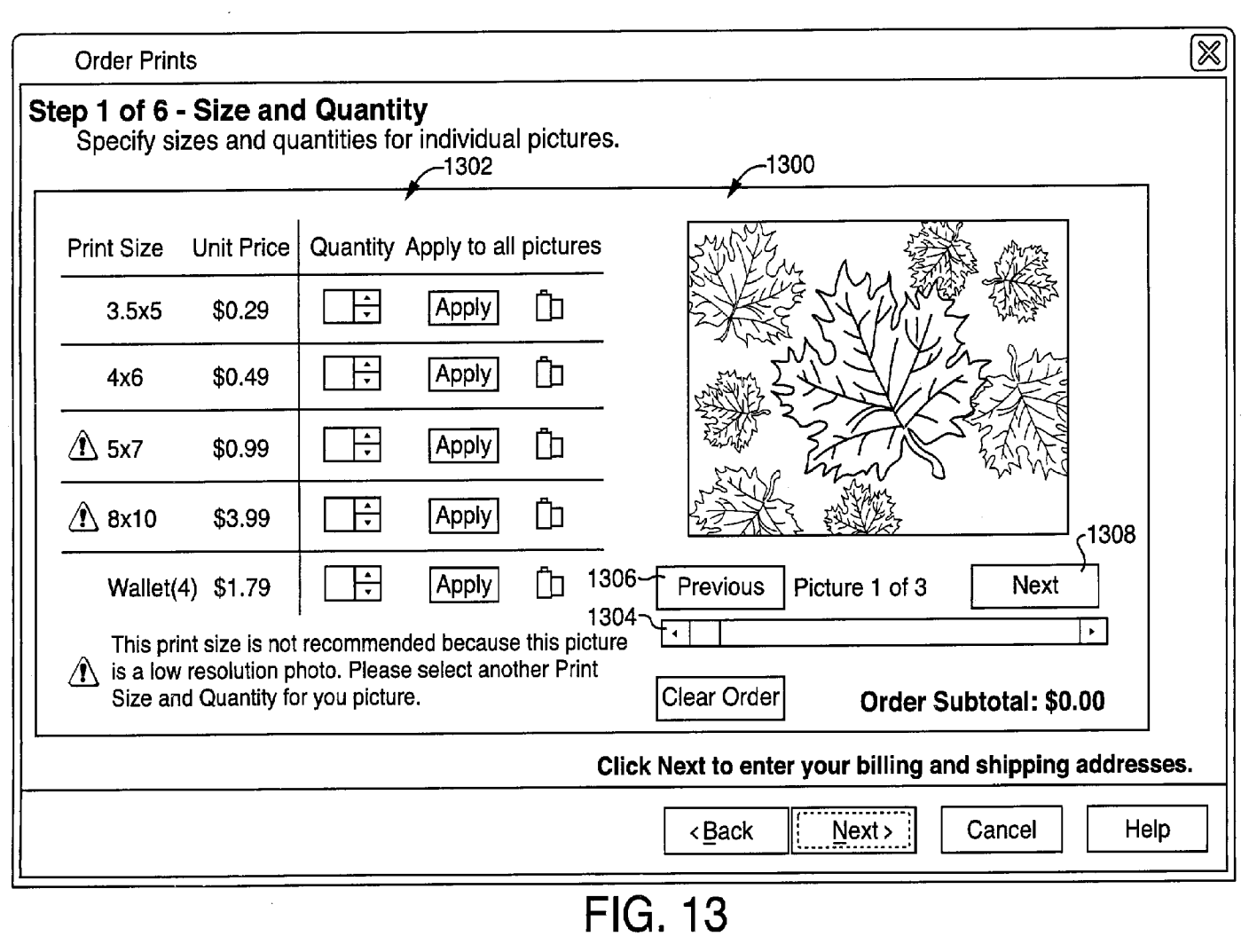

FIGS. 12 through 19 are screenshots that illustrate features of an image photo processing output process in accordance with the principles of the present invention.

DETAILED DESCRIPTION

Figure 1:
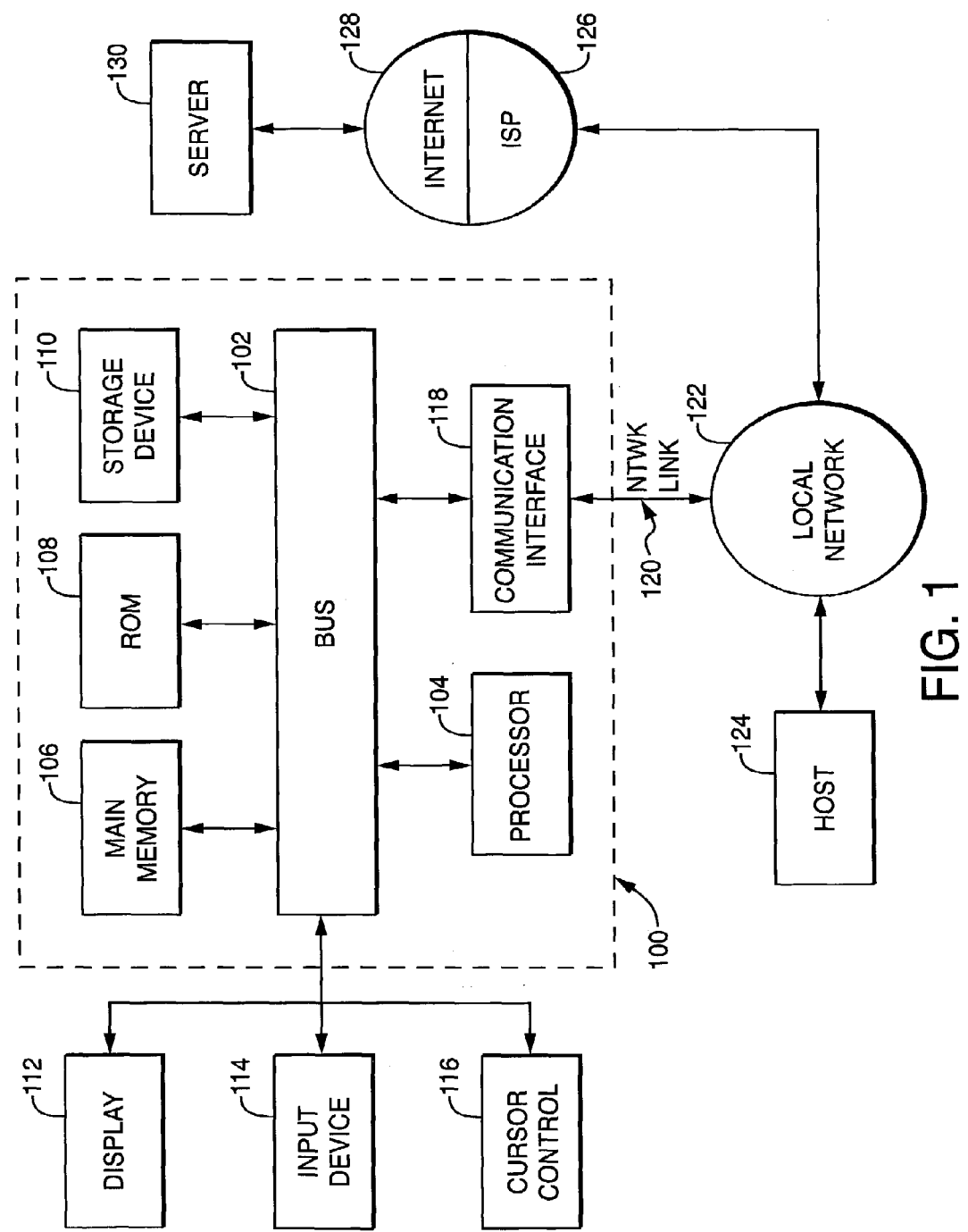
FIG. 1 is a conceptual block diagram of a system that may employ an image management system in accordance with the principles of the present invention.

A digital image management system in accordance with the principles of the present invention groups individual images into collections that, because they are rich in visual cues, are relatively easy for people to remember. Such a system collects metadata for each image to be archived and uses the metadata to organize the images into collections. Such a system may use visual metaphors to display images or collections of images and may use additional image information to communicate information about images, or collections of images. Rather than repeating the phrase "images, or collections of images" throughout this document, it should be understood that the terms may be used interchangeably herein. A user, searching for a specific image may first isolate a small group of collections, then a specific collection, and then finally, the specific image in the collection.

The process of generating and/or collecting metadata related to images may entail the gathering of metadata related to characteristics of the environment where the image was captured, to characteristics of the image's contents, or to characteristics of how a user has interacted with the image. Such metadata (properties for each image file) may be automatically, and continuously collected using a variety of devices and processes.

Characteristics of the environment where the image was captured include such things as; the time the picture was taken, which may be generated by a clock in the camera (system time); the location where picture was taken, geographic coordinates may be generated by a GPS device that is embedded in, or attached to, the camera; the light condition of an image, including the light intensity, color temperature, which may be generated by a light meter or an algorithm measuring the photon intensity captured by the imaging device (e.g., charge coupled device); exposure information, such as the shutter speed, f-stop, generated by the camera; and the make and model of digital camera used to capture the image.

Characteristics of an image's content may include; the presence of a particular geometric pattern (such as the Eiffel Tower), which patterns may be identified using a pattern recognition process; the presence a particular pattern that represents a person or animal, which may be identified through use of a facial recognition process; the presence of an particular alpha-numeric element in the image (such as the word "Atlanta"), which may be identified through use of an optical character recognition process; the presence of an alpha-numeric string description, which may be input by a user; the sharpness of an image (in or not in focus); the brightness and/or saturation of the image; the contrast of elements in the image; the skin-tone of the subjects in the image; the aspect ratio of the image frame; or the resolution of the image (number of pixels and bits per pixel). Image resolution and aspect ratio may be employed to identify image files that are not photographs and which, as a user's option, may be excluded, automatically, or on an image-by-image basis, from an image archive.

Characteristics of how the user has interacted with the image may include; the time the picture was loaded into computer; the frequency and characteristics of editing; the frequency and characteristics of retrieval from archive; the frequency and characteristics of images being sent through networks; the frequency and characteristics of image being printed; or frequency and characteristics of image being stored onto permanent media. Such user-interaction information may be generated by recording the "click stream" of the user as he/she uses an image archiving and presentation system in accordance with the principles of the present invention.

The process of grouping images into collections in accordance with the principles of the present invention creates collections that mimic common human categorization dimensions. Such categorizations include; by events, such as "a birthday party", or "the graduation"; by individuals, such as "Hannah", "Spunky the dog"; by places, such as "Florida", "Grandma's house"; by things, such as "my model trains", "open-sky scenery"; by interests, such as "Oshkosh fly-in", "Red Sox games"; or by type of picture, such as "photos taken with a camera" vs. "digital artwork that is not a photograph." Such groupings may be performed automatically by, for example, grouping by a single metadata element against a constraint. Examples of such a process include grouping all images with a "time take" in a span of 2 hours or grouping all images within a range of "color temperature" into a "candlelight" group. Grouping may be performed by matching a single metadata element against known reference point; grouping all images taken on "December 25th" into one collection, regardless of year. Another form of grouping entails the matching of metadata of a set of images against known frequency distributions of common events. For example, a set of images with a pattern of 2-3 images taken every few hours over seven days fits the distribution of a "vacation" and images that fall into such a frequency distribution may be grouped as vacation images. Another form of grouping employs a plurality of metadata elements with logical arguments such as "and", "or", "nor". For example, a grouping may include all images that are taken within a seven-day span AND that contain a specific pattern (e.g., the Eiffel Tower).

In one aspect, the process of displaying images in accordance with the principles of the present invention includes the use of visual display metaphors. The metaphors (such as a timeline, or map, for example) are present additional dimensions of information for the searcher. For example, using a timeline metaphor to display an archive provides users with information to quickly disregard a large number of collections in the wrong years, and focus on a subset that has a high probability of containing the desired image. The metaphors also serve to provide directional cues for visual searching; 1997 lays to the right of 1960. Examples of typical metaphors includes: temporal metaphors, such as timelines; geographical metaphors, such as maps; human relationship maps, such as family trees; activity venues, such as home, work or play areas; emotional states, such as happy or sad; and importance metaphors, which represent relative levels of importance through the size of image displayed, or other graphical/visual cues. Combinations of metadata may be presented to aid a user in a search for an image or a collection of images. For example, images or collections may be positioned along a timeline by date and the timeline can include an activity chart to highlight the busiest periods of picture taking.

In another aspect of the invention, images, or collections of images, may be organized into display categories that provide additional dimensions of information to facilitate the identification of a specific image located within an archive. Such categorizations include; emotional importance (favorites versus also-rans); artistic or technical superiority; the frequency of usage (how often a user sends, prints, or projects an image); the type of poses within an image (e.g., informal everyday, versus formal group shots); relationships (e.g., family, friends, work colleague); or personal versus public. Various strategies can be utilized to display different images/collections belonging to these different categories. The goal is to provide visual prominence for specific categories, as well as signal relationships between images/collections.

Visual prominence and relationships may be signaled by varying the size of, moving, varying the shape of, altering the luminance or transparency of, varying the hue of, altering the relative position of (foreground versus background), altering the relative position on a display device (center screen versus edge), or by associating with additional icons or mnemonic devices (e.g., a "thumbs up" icon), a thumbnail image. Varying visual prominence may be used, for example, to display images with high frequency of being printed more prominently; to display images containing a specific object pattern (for example "Eiffel Tower") with a specific hue regardless of which collection it resides in; to display images with the same characteristic (e.g., the selection of three images with a "Christmas" characteristic) more prominently; to display with greater prominence photos with high sharpness, brightness, and color saturation (higher technical quality, and therefore more desirable); to display with greater prominence photos with particular subject skin tone characteristics (as predictor of high quality); to display with greater prominence photos with multiple subjects in face-forward positions (group poses); or to display with greater prominence photos with subjects representing large portion of the image space (close-up shots, and therefore, more emotionally and technically superior).

A digital image management system in accordance with the principles of the present invention may be implemented on one or more computers. For example, users may store their images on a network server, and the users may access the images via their workstations or personal computers (PCs) and network communications to and from the server. If a user's station runs a simple browser application, then the image management software may run on either the server or the browser. The digital image management system may also run within a single user's workstation or PC, for example as an application running on top of the computer's standard operating system.

Those skilled in the art will recognize that the inventive digital image management system can run on a variety of different types of otherwise general-purpose computers and will generally be familiar with the structure and operation thereof. However, to insure a full appreciation of the various inventive features, it may be helpful to briefly discuss an example of such a computer.

FIG. 1 is a block diagram that illustrates a computer system 100 upon which an embodiment may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information (including the images, for example) and instructions.

The computer system 100 may function as a host or network server, but in the illustrated example, the computer 100 is an end user's station or PC. Hence, the Illustrated embodiment of the computer system 100 also provides a local user interface, for example, so that the system appears as a personal computer or workstation. The computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The inventive concepts discussed above relate to the use of computer system 100 for management of personal digital photography archives and the retrieval of specific images from these archives, in a manner that is fitting with human cognitive processes and memory schemata. As noted, the software for implementing the management functions may run on a network server. In the illustrated embodiment, the software would run as an application on the computer system 100.

In any case, the various instructions may be read into main memory 106 from another computer-readable medium, such as storage device 110. Execution of the sequences of instructions contained in main memory 106 causes processor 104 to perform the process steps described herein for management and retrieval of images. One or more processors in a multiprocessing arrangement may also be employed to execute the sequences of instructions contained in main memory 106. In alternative embodiments, hard-wired circuitry may be used in place of or in combination with software instructions to implement the digital image management techniques described above. Thus, embodiments of the digital image management system are not limited to any specific combination of hardware circuitry and software.

Aspects of the digital image management system may be embodied in software products comprising a computer readable medium bearing executable code representing the software for controlling the computer 100 to implement the inventive image management system. The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables;

copper wire and fiber optics, including the wires that comprise bus 102. Transmission media can also take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to the bus 102. Communication interface 118 provides a two-way data communication coupling to a network link 120 that is connected to a local network 122. For example, for one of the user, the communication interface 118 may be an integrated services digital network (ISDN) card or a modem to provide a data communication connection to a corresponding type of telephone line for dial-up communication with an Internet service provider (ISP) network. As another example, communication interface 118 may be a local area network (LAN) card to provide a data communication connection to a compatible LAN. Wireless links may also be implemented. In any such implementation, communication interface 118 sends and receives electrical, electromagnetic or optical signals or waves that carry digital data streams representing various types of information, which may include selected images and/or portions or complete copies of the executable software instructions.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information. The host computer 124 for example, may be a source or repository of certain of the images. The host computer 124 may operate as an exchange, for communication of images between computers 100 of various users. The host computer 124 also may serve as a source for downloading the image management system software or upgrades thereof to the user's computer 100.

Computer system 100 can send messages and receive data, including both images and program code, through the network(s), network link 120, and communication interface 118. In the Internet example, a server 130 might transmit a request code for initiating downloading of an application program through Internet 128, ISP 126, local network 122 and communication interface 118. One such downloaded application provides for managing personal images as described herein. The received code may be executed by processor 104 as it is received, and/or stored in storage device 110, or other non-volatile storage for later execution. In this manner, computer system 100 may obtain application code in the form of a carrier wave.

A system and method in accordance with the principles of the present invention leverages the superb human capability for remembering events, people, and emotional context, as well as human preference for visual and spatial over textual and linguistic representations of information to provide a digital imagery management system. Such a system allows users to easily find and retrieve specific image files while, at the same time, requiring minimal prior organization efforts and/or textual inputs.

In a digital image management system in accordance with the principles of the present invention, metadata are acquired, associated with, and stored along with one or more images. Metadata may fall into one or more of three general categories: characteristics of the environment, characteristics of the image's content, or characteristics of how a user has interacted with the image. The metadata are used to group images into collections that mimic human categorization schemes. Such collections thereby make it easier for human beings to remember and retrieve individual images and/or collections of images. An image may be grouped into a plurality of collections.

Figure 2:
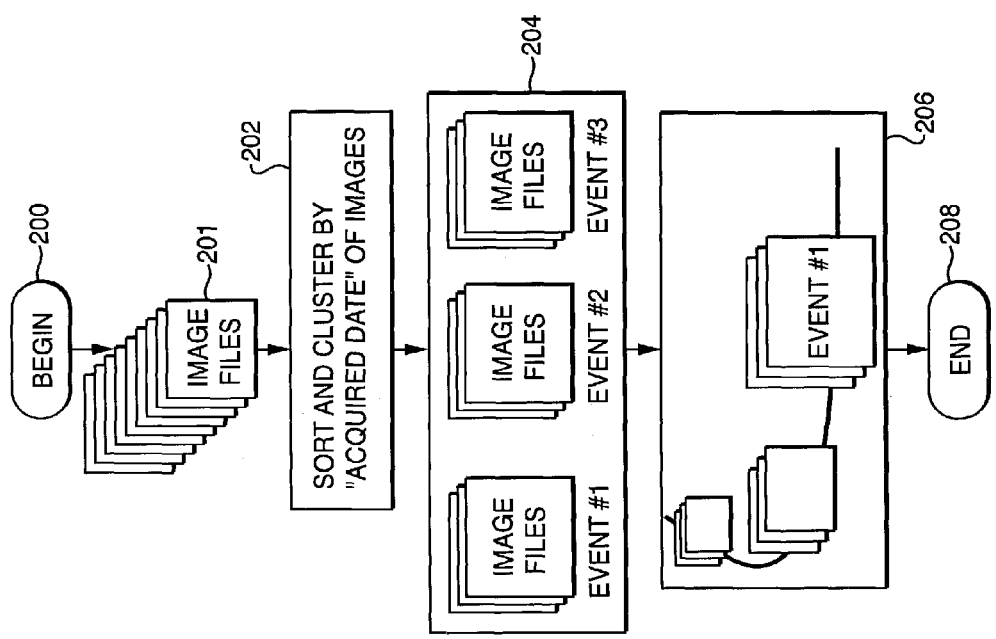
FIG. 2 is a chart that depicts the process of archiving and presenting images in accordance with the principles of the present invention.

The process of acquiring images and metadata related to characteristics of the images' environments and grouping images into collections according to the metadata is illustrated in the flow chart of FIG. 2. In this illustrative embodiment, the characteristic of the images' environment used to group the images is the time the image was acquired. More specifically, in this example, the metadata used to group images is the date a photo was taken. The process begins in step 200 and proceeds to step 201 where metadata, in the form of the image's date of capture (e.g., the date a picture was taken in the case of a photograph) is acquired for each image to be archived.

From step 201, the process proceeds to step 202 where images are sorted according to metadata criteria. In this illustrative example, the image files are divided into "events" according to their associated "time of capture" metadata. The sorting process of step 202 could be as simple as clustering images strictly according to the date of capture, that is, each date has associated with it a separate cluster of images, or, still using images' time of capture metadata, more complex clustering could be achieved. For example, images taken on sequential days may be assumed to be related in some way, such as a vacation, or honeymoon. Additionally, other metadata, such as exposure information or the subject matter of an image, may be used to determine, for example that images taken on sequential dates, with bright exposures, were beach vacation pictures and, consequently, may be grouped into a "vacation cluster." Such a sorting process is described in greater detail in the discussion related to FIG. 3. Time and date information are typically generated and stored by a digital camera along with image information.

One characteristic of an image's environment, the time a picture was taken, was a type of metadata used in the flow chart illustration of FIG. 2. The location of an image is another type of metadata related to an image's environmental characteristics. The location of the image may be obtained, for example from a global positioning system device that is embedded in or attached to the camera that captures the image. Light information is another type of environmental characteristic that may be employed as metadata in the process of clustering images. Light intensity and color temperature, for example, may be obtained from a light meter or from analysis of the photon intensity of a camera's light-sensor. Although typically a charge coupled device, such a light sensor may employ other technologies, such as complimentary metal oxide semiconductor (CMOS) active pixel sensors as described in U.S. Pat. No. 5,324,958, issued to Mead et al, which is hereby incorporated by reference in its entirety. Other environmental characteristics that may be used for clustering, include exposure information, such as shutter speed and f-stop, and the model of camera with which the image was captured.

In this illustrative example, the result of a clustering process is a series of events, as illustrated by events #1, #2, and #3, of step 204. Although images are related to one another according to these "events", they are not necessarily stored in contiguous locations. The images could, for example, be related by "tags" that indicate which event an image is associated with. Additionally, each image may be associated with a plurality of clusters (in a temporal clustering such as just discussed, the clusters may be referred to as events), as indicated by an image's tag. After storing and archiving, images may be accessed, as shown in step 206, through use of a visual metaphor. In this illustrative embodiment, events (groups of images clustered according to time of acquisition), are presented along a time line visual metaphor. In this illustrative embodiment, a sense of time is graphically imparted to the time line presentation by dedicating more display area to an event icon that represents a more recent event and less display area to an event icon that represents an event that occurred. This perspective trick need not be employed with a single, linear vanishing point. In an illustrative embodiment, as will be described in greater detail in the discussion related to FIG. 4, the timeline may be a curved timeline that, when event icons are moved forward or backward to facilitate searching in time, gives the impression of events respectively swooping toward or away from a user. After providing access to images through the use of a graphical metaphor, as in step 206, the process proceeds to end in step 208.

Clustering processes, as previously described, may be based on one type of metadata, such as time of image acquisition, or a plurality of types of metadata, such as time of acquisition, exposure levels, frequency of access, or recognized patterns (e.g., the Eiffel Tower, "Grandpa", etc.), for example. Additionally, a clustering process may be iterative. The time of acquisition clustering process described in the discussion related to FIG. 2, for example, may be a process whereby images are associated with one another according to the temporal proximity of image acquisition, with a first image being associated with a subsequently examined image the acquisition time of which is within a predetermined range of the acquisition time of the first image. Images may be clustered around weighted sample centers (that is, weighted by the number of images falling within a sampling period) and those centers may shift as more and more image metadata is employed to cluster the images. The clustering algorithms may be allowed to run until they meet convergence criteria and/or user interaction may be involved at some point in the process to allow a user to "tweak" the clusters.

Figure 3A:
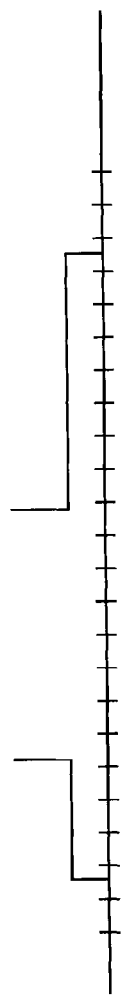
FIGS. 3A through 3D are bar charts used to illustrate on aspect of clustering images in accordance with the principles of the present invention.
Figure 3B:
Figure 3C:
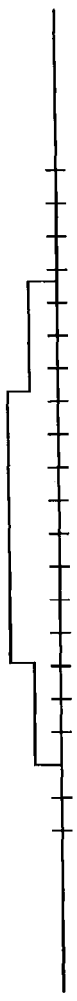
Figure 3D:
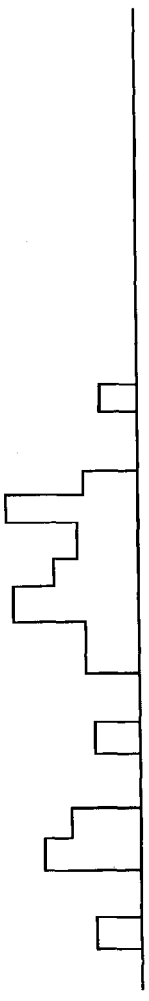

The bar graphs of FIG. 3A through FIG. 3 represents different time-frequency distributions of image capture, such as may be associated with different events. The distribution of FIG. 3A, for example, indicates a relatively steady level of image capture activity, with a peak near the middle of the time line. The profile of such a distribution may be varied by altering the time scale, as in FIG. 3B. Accordingly, the "granularity" of time scale (or other metadata clustering criteria) will have an impact on the type of clusters formed and, consequently, the granularity, or sampling frequency, should be chosen to ensure that events are sorted in a reasonable manner. Additionally, the sampling frequency may be varied. The spatial sampling may be varied, from city, to country, to continent, for example, to sort images from a single trip in which images were taken at various locations, at different times (e.g., images captured in New York, N.Y., then Toronto, then again in New York). A fine-grain (e.g., city level) sampling may be employed to sort images from various portions of a single trip, for example. A course-grain (e.g., continent level) sampling may be used to sort images from various trips. Temporal (or other metadata) sampling may be varied to similar effect. The relatively long period of constant image acquisition represented by the bar chart of FIG. 3C may be related to a single vacation, for example. Altering the sampling frequency may result in the clusters of FIG. 3D.

Figure 4:
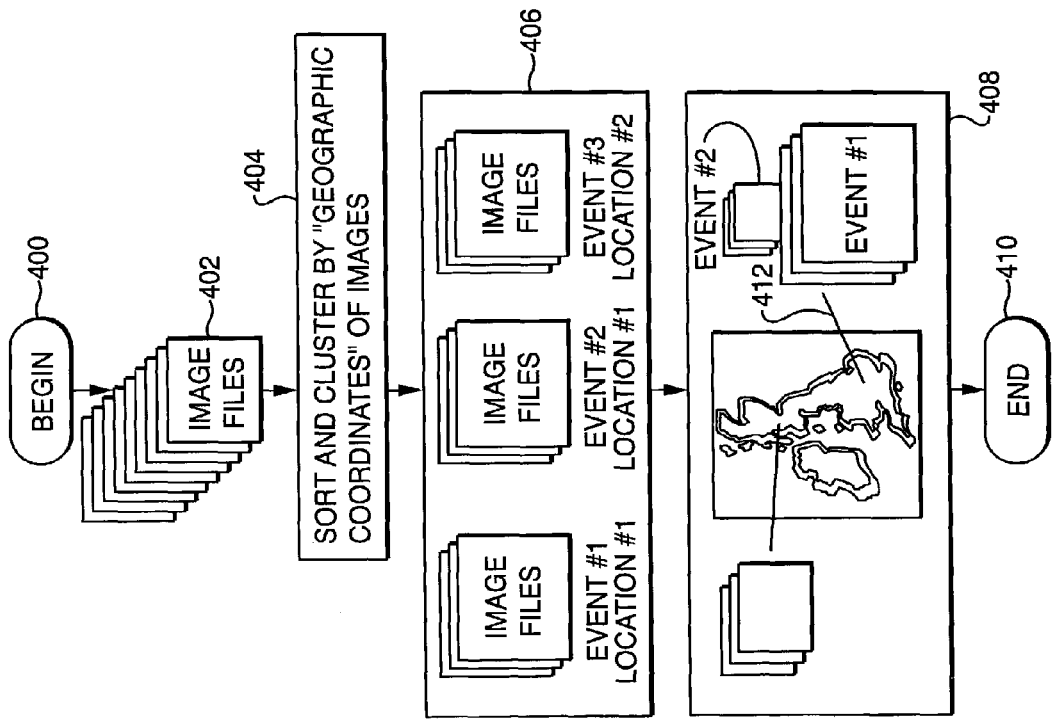
FIG. 4 is a chart that depicts the process of archiving and presenting images in accordance with the principles of the present invention.

A process in accordance with the principles of the present invention of acquiring images and metadata and grouping images into collections according to combinations of metadata types is illustrated in the flow chart of FIG. 4. In this illustrative embodiment, metadata related to two different characteristics of an image's environment, the time of acquisition and the location of the image's subject matter are employed to group the images into collections. The process begins in step 400 and proceeds to step 402 where various types of metadata are acquired to be archived along with image data. The various types of metadata may be from any of the three general categories previously described (i.e., characteristics of the environment, characteristics of the image's content, or characteristics of how a user has interacted with the image). In this illustrative embodiment, metadata, in the form of the image's date and time of capture (e.g., the date a picture was taken in the case of a photograph) is acquired for each image to be archived. Additionally, metadata of another type, the image's subject matter location (i.e., the longitude and latitude of the image's subject matter) is captured. The location information may be acquired, for example, from a global positioning system (GPS) receiver that is interfaced to the camera that captures the images.

From step 402, the process proceeds to step 404, where images are sorted according to metadata criteria. In this illustrative example, the image files are divided into "events" according to their associated time-of-capture and location metadata. The illustrative clustering algorithm assigns images to the same event if they are within ten miles of a central event location and are captured within twenty-four hours of a central event time. The sorting process of step 404 could be as simple as clustering images strictly according to the date and location of capture. That is, each date and location may have associated with it a separate cluster of images. Dates and locations may be defined in terms of ranges. For example, a date may be specified as falling between 0:00 and 24:00 Greenwich Mean Time (GMT) on a certain date, for example. Dates may include a time component that allows the image capture to be more specifically associated with a particular event, between 11:30 and 02:30 GMT on a certain date, for example. As previously discussed, more complex clustering could be achieved. For example, images taken on sequential days may be assumed to be related in some way, such as a vacation, or honeymoon. Additionally, other types of metadata, such as image content information (e.g., exposure information or the subject matter of an image) or user interaction information (e.g., frequency of interaction) may be used in combination with image environment information in the clustering process of step 404.

In this illustrative example, the result of a clustering process is a series of events, as illustrated by events #1, #2, and #3, of step 406. Although images are related to one another according to these "events", they are not necessarily stored in contiguous locations. The images could, for example, be related by "tags" that indicate which event an image is associated with. Different images may be associated with the same location and same time (image files associated with event 1), the same location at different times (image files associated with events 1 and 2), different locations at the same time or different locations at different times (images files associated with events 1 and 3 or events 2 and 3, for example).

After storing and archiving, images may be accessed, as shown in step 408, through use of a visual metaphor. In this illustrative embodiment, events (groups of images clustered according to time and location of acquisition) are presented in relation to a map. Individual events may be represented by a file folder, for example, with a reference line drawn from the file folder to a point on the map corresponding to the location of the image's capture. Each folder may also include some indication of the range of dates or times related to the event. Images associated with events 1 and 2, for example, were captured in the same location, as indicated by reference line 412, yet, because they were captured at different times, the images were clustered in different events. A time range, or event name (something more descriptive than event #1 or event #2), may be used on the cover of each event file folder to assist a user in recognizing an event and to thereby permit the ready retrieval of archived images. After providing access to images through use of a graphical metaphor, as in step 408, the process proceeds to end in step 410.

Figure 5:
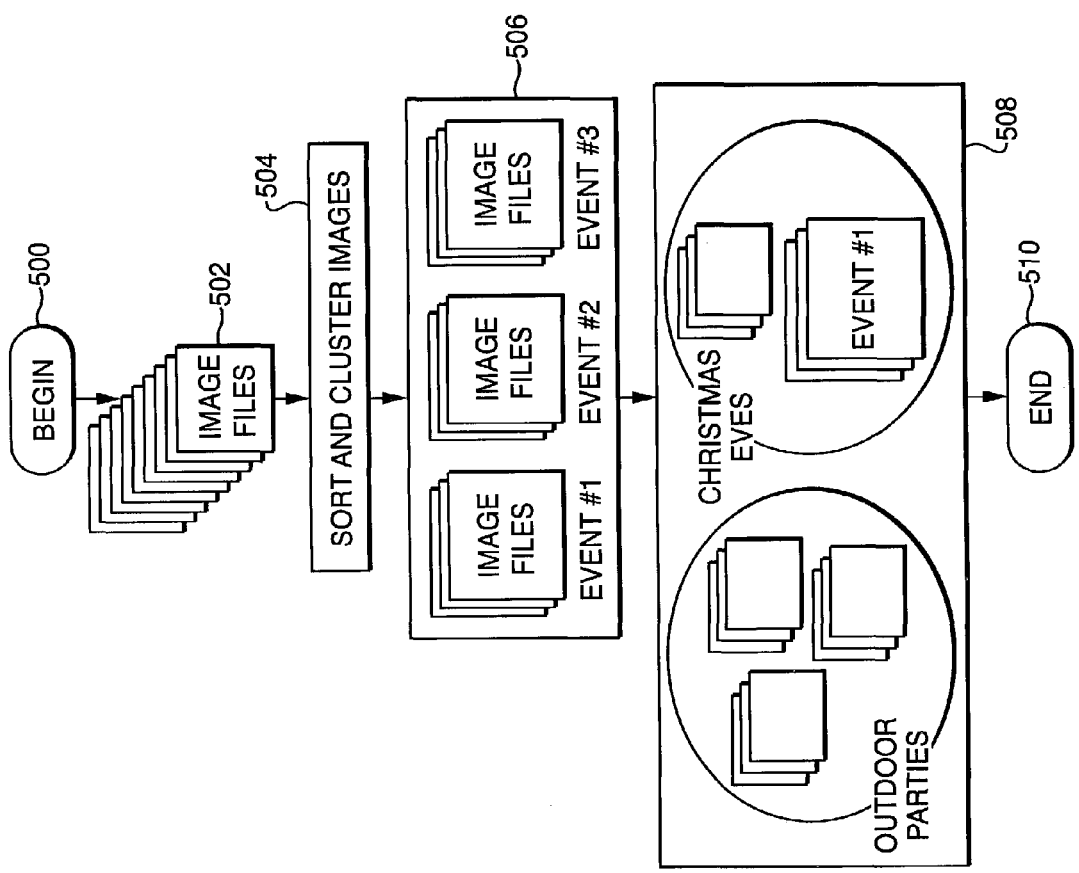
FIG. 5 is a chart that depicts the process of archiving and presenting images in accordance with the principles of the present invention.

Another illustrative embodiment of a process in accordance with the principles of the present invention of acquiring images and metadata and grouping images into collections is illustrated in the flow chart of FIG. 5. In this illustrative embodiment, metadata related to a variety of different characteristics of an image's environment, the time of acquisition and the location of the image's subject matter are employed to group the images into collections. The process begins in step 500 and proceeds to step 502 where various types of metadata are acquired to be archived along with image data. As previously noted, various types of metadata may be from any of the three general categories previously described (i.e., characteristics of the environment, characteristics of the image's content, or characteristics of how a user has interacted with the image).

From step 502, the process proceeds to step 504, where images are sorted according to metadata criteria. In this illustrative example, the image files are divided into "events" according to their associated time-of-capture and location metadata. In this illustrative embodiment, metadata, in the form of the image's date and time of capture, the image's subject matter location, the light intensity of the scene, color temperature of the scene, whether or not a flash was used in capturing the image, and the number of pictures in a given cluster are all used in the clustering process.

In this illustrative example, the result of a clustering process is a series of events, as illustrated by events #1, #2, and #3, of step 506. As previously noted, although images are related to one another according to these "events", they are not necessarily stored in contiguous locations. The images could, for example, be related by "tags" that indicate which event an image is associated with. After storing and archiving, images may be accessed, as shown in step 508, through use of a visual metaphor. In this illustrative embodiment, events are presented in relation to social occasions, such as the illustrated, "Christmas Eves", or "Outdoor Parties". Graphics (e.g., Santa Claus in the case of the "Christmas Eves" events) may be used to assist a user in recalling images. After providing access to images through use of a graphical metaphor, as in step 508, the process proceeds to end in step 510.

Figure 6:
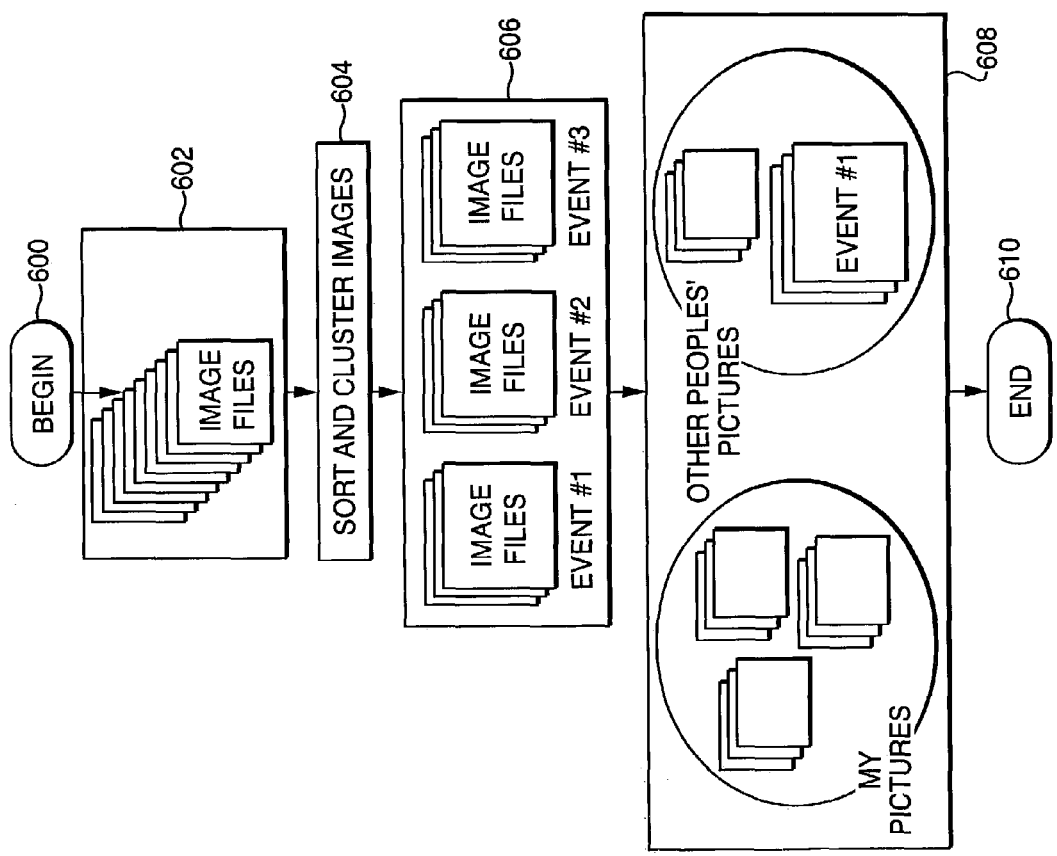
FIG. 6 is a chart that depicts the process of archiving and presenting images in accordance with the principles of the present invention.

The flow chart of FIG. 6 outlines a process in accordance with the principles of the present invention of acquiring images and metadata and grouping images into collections. The process begins in step 600 and proceeds to step 602 where metadata is acquired to be archived along with image data. In this illustrative embodiment, metadata related to each image's content is employed for the sorting and clustering of images. From step 602, the process proceeds to step 604, where images are sorted according to metadata criteria. In this illustrative example, the image files are divided into "events" according to their associated aspect ratio, image size (e.g., the number of pixels in an image), the average brightness of an image, and an entry folder name. In this illustrative example, the result of a clustering process is a series of events, as illustrated by events #1, #2, and #3, of step 606. After storing and archiving, images may be accessed, as shown in step 608, through use of a visual metaphor. In this illustrative embodiment, events are presented in relation to whether they are "my pictures" or "other peoples pictures." Additional graphics (e.g., an image of the user) may be used to assist a user in recalling images. After providing access to images through use of a graphical metaphor, as in step 608, the process proceeds to end in step 610.

Figure 7:
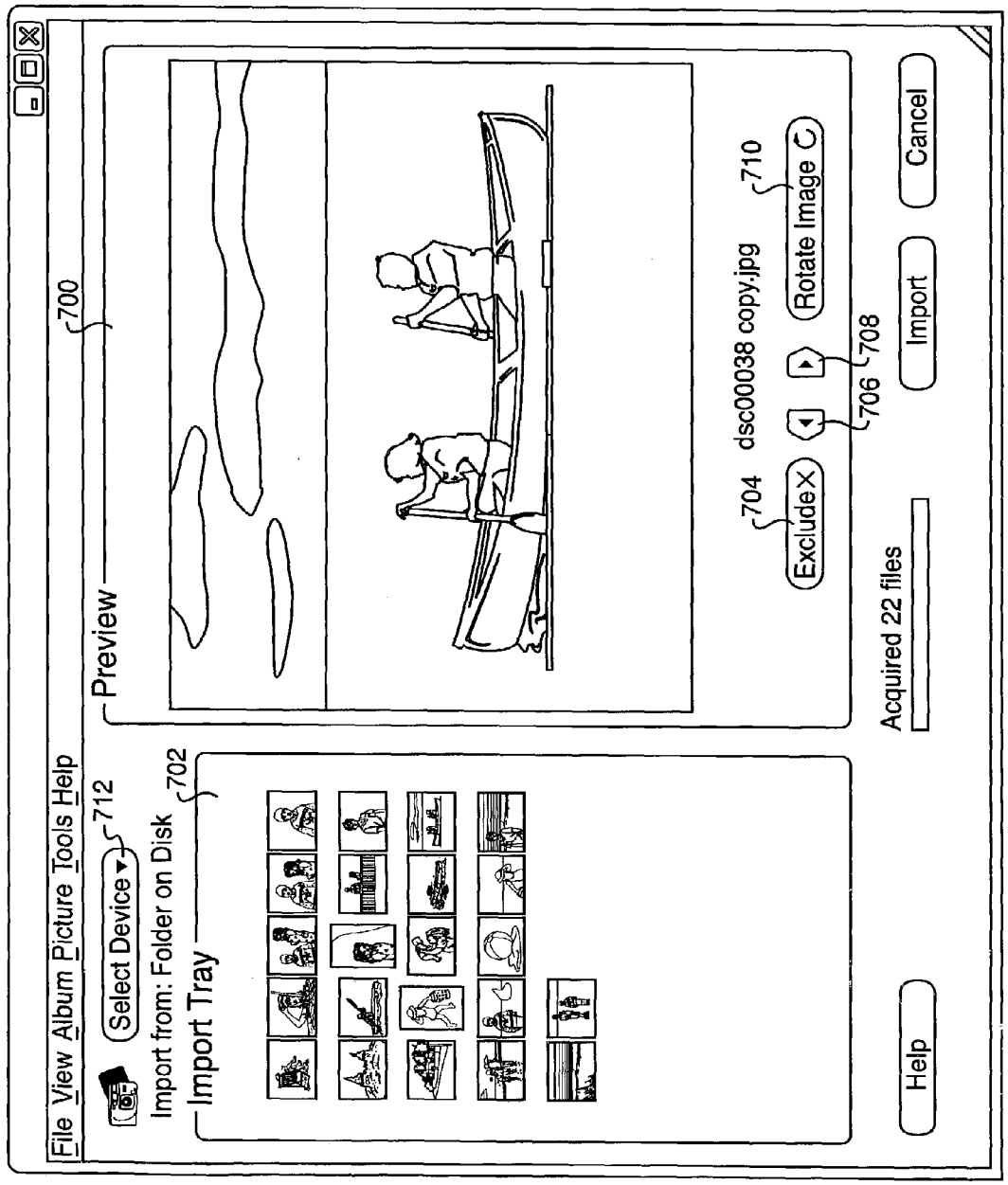
FIG. 7 is a screenshot that illustrates features of an image import process in accordance with the principles of the present invention.

FIG. 7 is an illustrative screenshot of an image management system display in accordance with the principles of the present invention. The display includes two major functional areas; a screen area 700, labeled "Import Tray," and an area 702 labeled "Preview." The Import Tray 700 displays "thumbnails" (i.e., small images) of images being imported from a source, such as a digital camera. The Preview area 702 displays a large version of an image selected from among the thumbnails of the import tray 700. Functional buttons 704, 706, 708, and 710 permit a user to exclude a specific image from a group to be imported, return to a previously viewed image, proceed to the next image, or rotate an image. In addition to selecting images from the import tray 702 for viewing in the preview area 700 by scrolling via the "previous" 706 and "next" 708 buttons, a user may click on a thumbnail of interest displayed in the Import Tray 702. The system highlights the thumbnail image corresponding to the large image displayed in the Preview area 700, in this illustrative embodiment by overlaying a red cross on the thumbnail image. A device selection button 712 permits a user to select from a variety of image sources devices, such as a digital camera or files stored on another computer, for example. The Import tray displays a thumbnail for each image contained within the image source.

Figure 8:
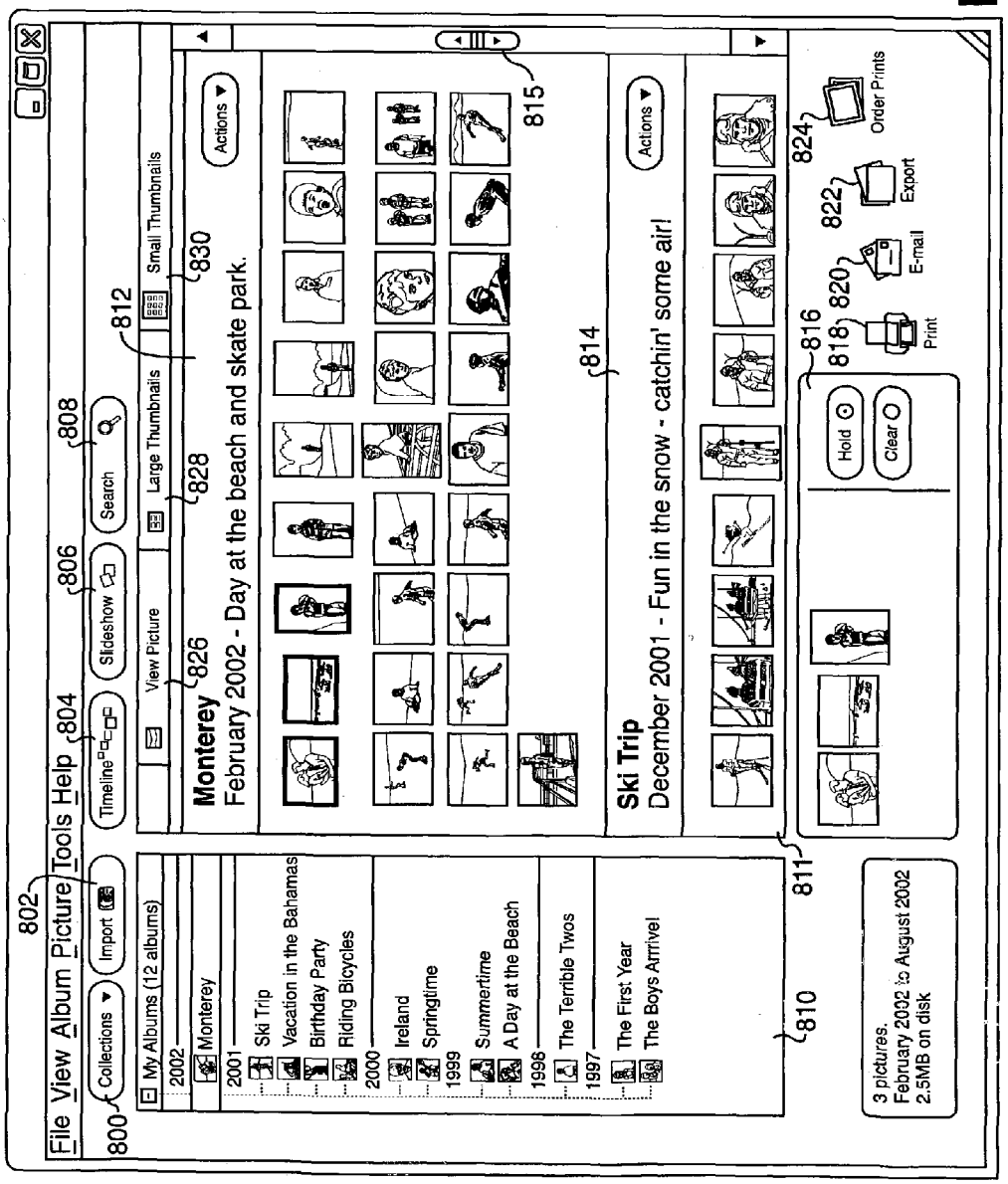
FIG. 8 is a screenshot that illustrates features of an image sharing, or output, process in accordance with the principles of the present invention.

The screenshot of FIG. 8 depicts a way in which a user may interact with an archiving system in accordance with the principles of the present invention. Such a screen may be used as a "main screen" or base starting point for interaction with archived images. The "Collections" button 800 allows a user to sort through archived and sorted images. The "Import" button 802 allows a user to import images from another source. The Timeline button 804 allows a user to display archived images using the previously discussed timeline metaphor. The Slideshow button 806 allows a user to display images using a slideshow metaphor. And, the Search button 808 allows a user to search through archived images using keywords that may, for example, have been entered manually as captions during the archiving process, or that reference metadata captured by an image archiving and presentation system in accordance with the principles of the present invention. A display area 810 is set aside for presenting archived collections. In this illustrative embodiment the images are clustered into twelve albums. Albums are also clustered according to the year in which images contained within them were first acquired (e.g., Ski Trip in 2001, Trip to Ireland in 2000). A display area 811 displays images within the albums presented in area 810. In this illustrative embodiment a title area, title areas are associated with each album (e.g., title area 812 associated with the "Monterey" album, title area 814 associated with the 2001 Ski Trip). A slide bar 815 allows a user to browse through the various albums. The system includes a picture tray 816 to gather images from the various albums (for example, the first three images of the Monterey album are gathered in the picture tray 816). Buttons 818, 820, 822, and 824 respectively allow a user to print, email, export, or order prints for images contained within the picture tray 816 (which may expand to accommodate more images). In accordance with the principles of the invention, the display controller creates the thumbnail images for display "on the fly," thereby permitting very rapid scrolling through the various albums. That is, rather than rendering thumbnail images for all images stored in all the albums, and shuffling among all those images as a user employs the slide bar 815 to scroll through images, the display controller renders only those images in the display area 811 and images "on the periphery" of the display area 811. By "on the periphery" of the display area 811, we mean those images that would immediately be scrolled into view by operation of the slide bar 815. The controller may "render ahead" a few rows of thumbnail images in either direction, and/or it may anticipate the direction of browsing, given the history of browsing, and render more thumbnail images in the anticipated direction of browsing. Control buttons associated with the display area 811 allow a user to view an individual image (button 826), view large thumbnails (button 828), or view small thumbnails (button 830).

Figure 9:
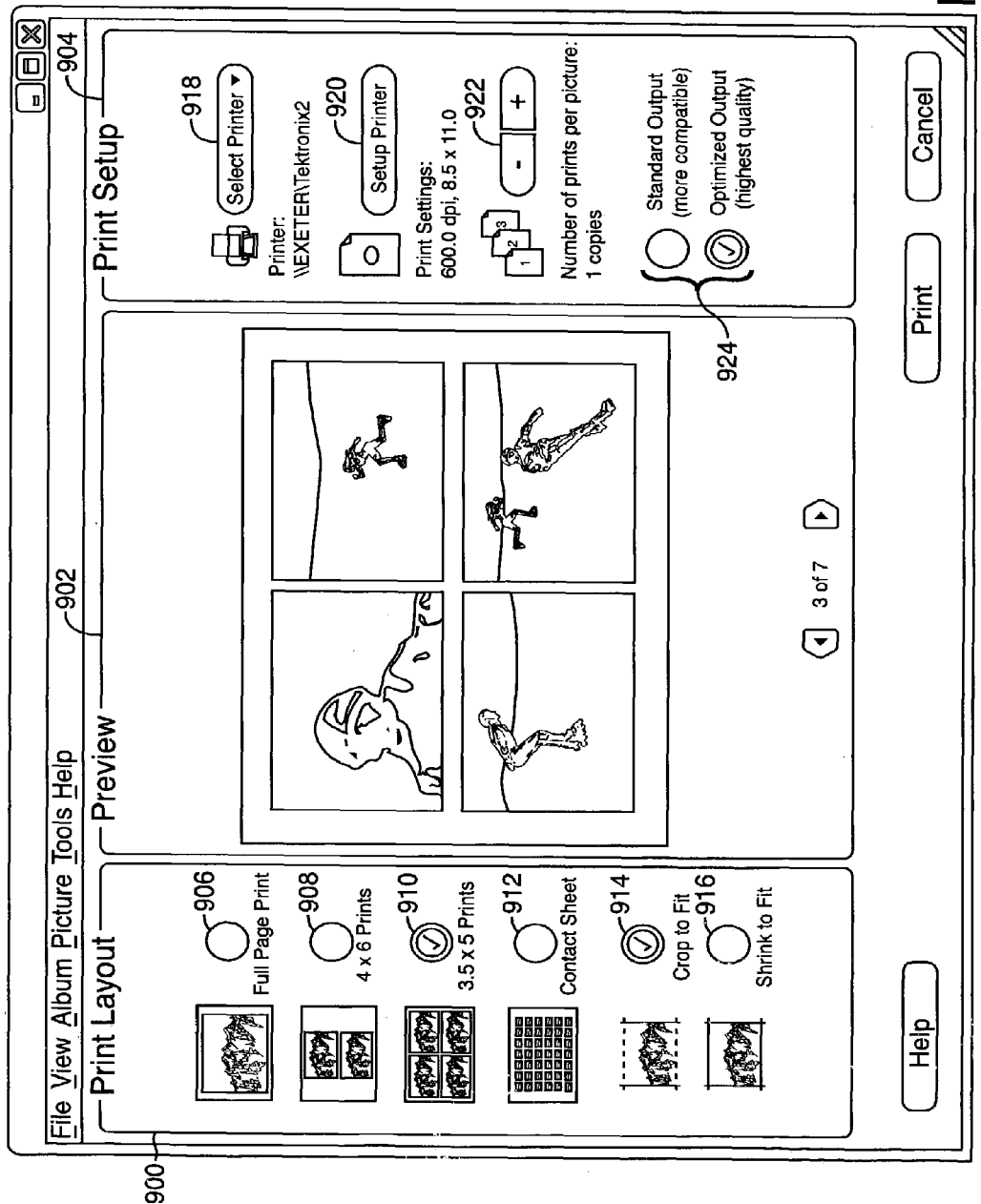
FIG. 9 is a screenshot that illustrates features of an image print output process in accordance with the principles of the present invention.

FIG. 9 is a screenshot that illustrates the format of a "Print" screen, such as may be accessed by activation of the print button 818 of FIG. 8. The screen is divided into three major portions; Print Layout 900, Preview 902, and Print Setup 904, that provide a user with a graphical interface for the performance of print-related functions. A user may select from a variety of layout options, such as full page 906, 4×6 908, 3.5×5 910, or contact sheet 912. Additionally, Crop to Fit 914 and Shrink to Fit 916 options are presented. The Preview section 902 provides a "what you see is what you get" (wysiswyg) preview of one or more selected images to be printed. Controls within the Print Setup region 904 allow a user to select a printer 918, set up a printer 920, select the number of copies to be printed of each image 922, and select the printer output quality 924.

Figure 10:
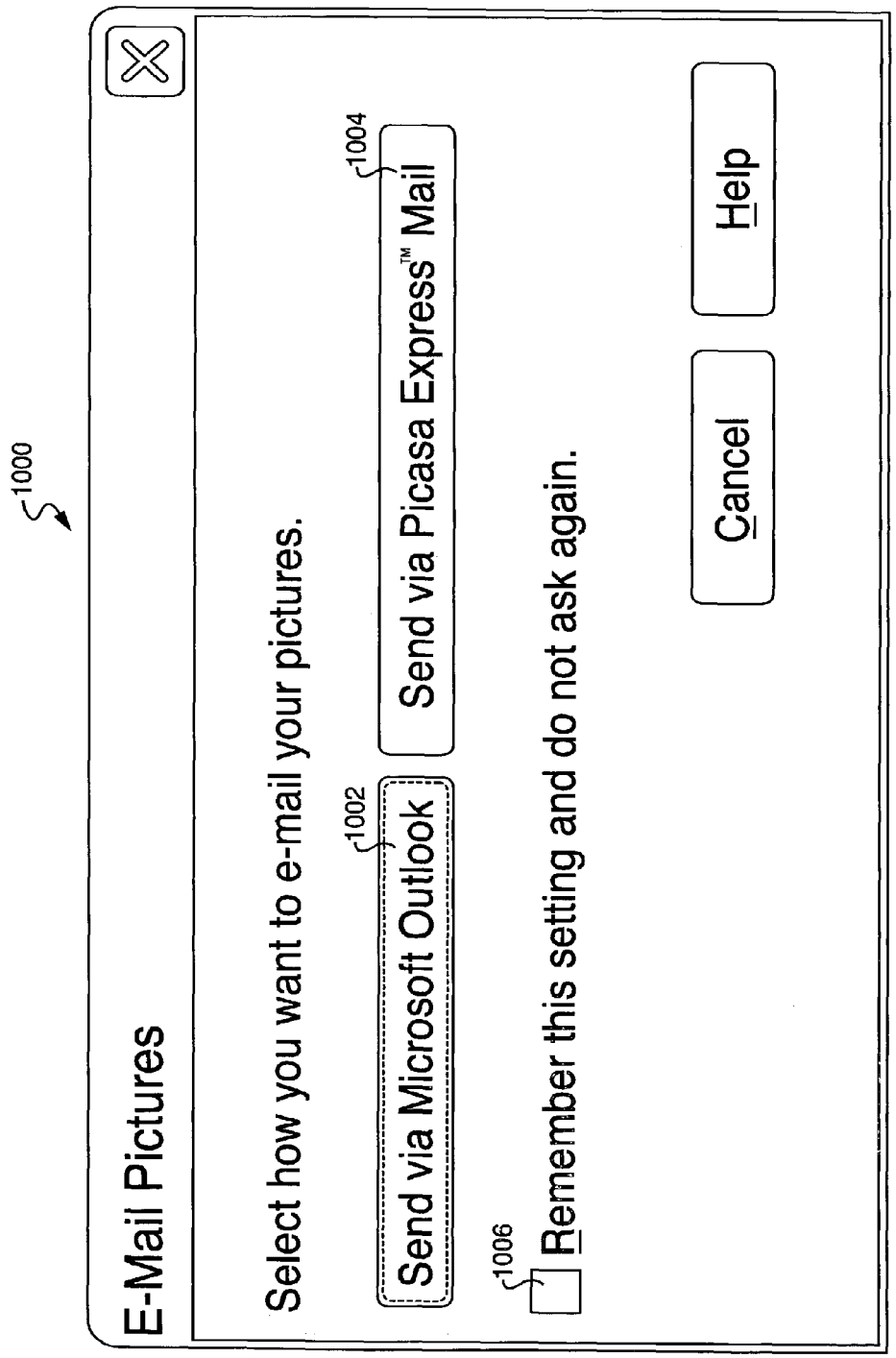
FIGS. 10 and 11 are screenshots that illustrate features of an image email output process in accordance with the principles of the present invention.

Activating the email button 820 of FIG. 8 yields an email interface, such as the dialog box 1000 of FIG. 10. The dialog box 1000 allows a user to select the method of emailing images. In this illustrative embodiment, a user may choose to email images using either Microsoft Outlook 1002 or Picasa Express™ E-Mail 1004. A box 1006 allows a user to select a default setting.

Figure 11:
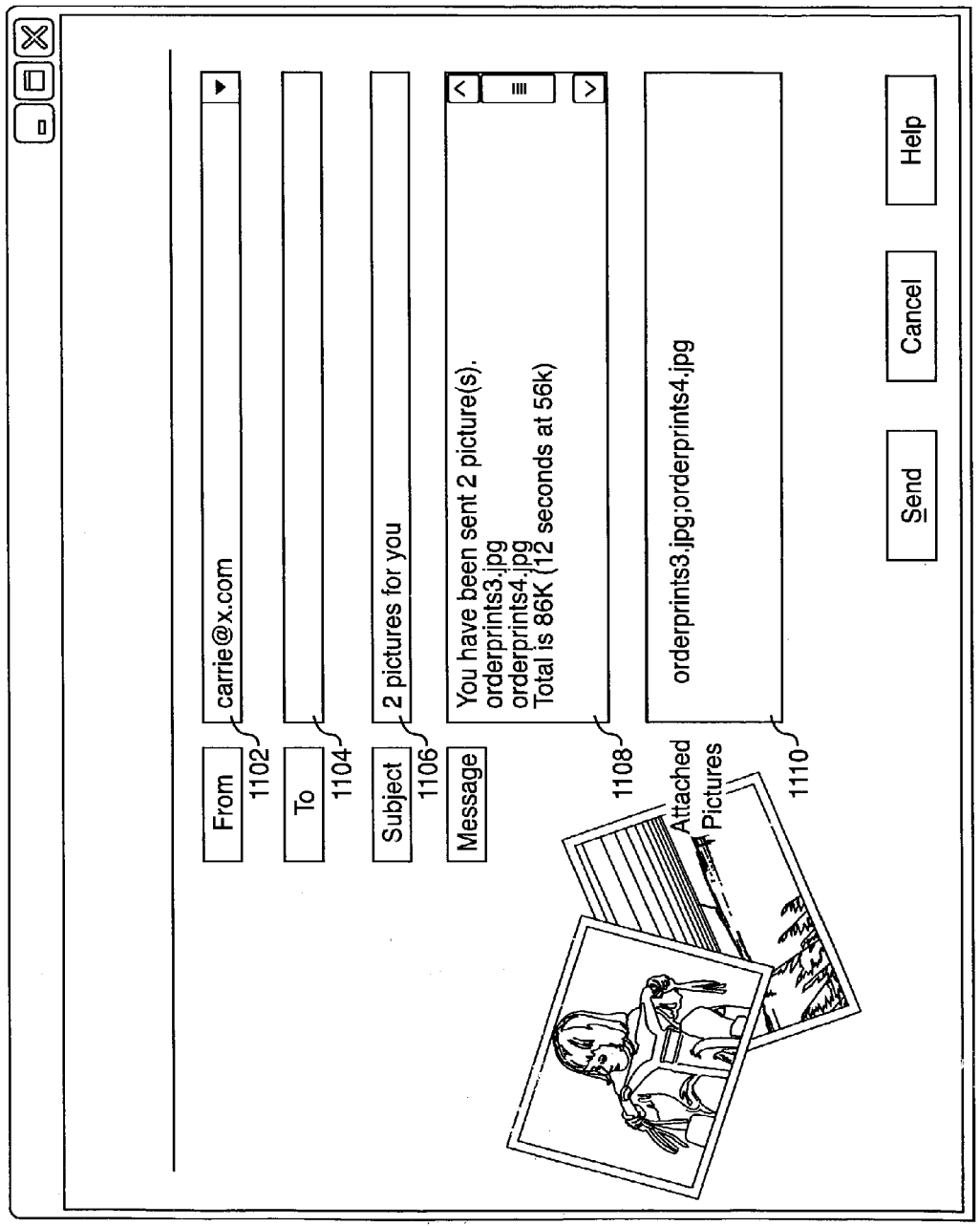
Figure 14:
Figure 18:
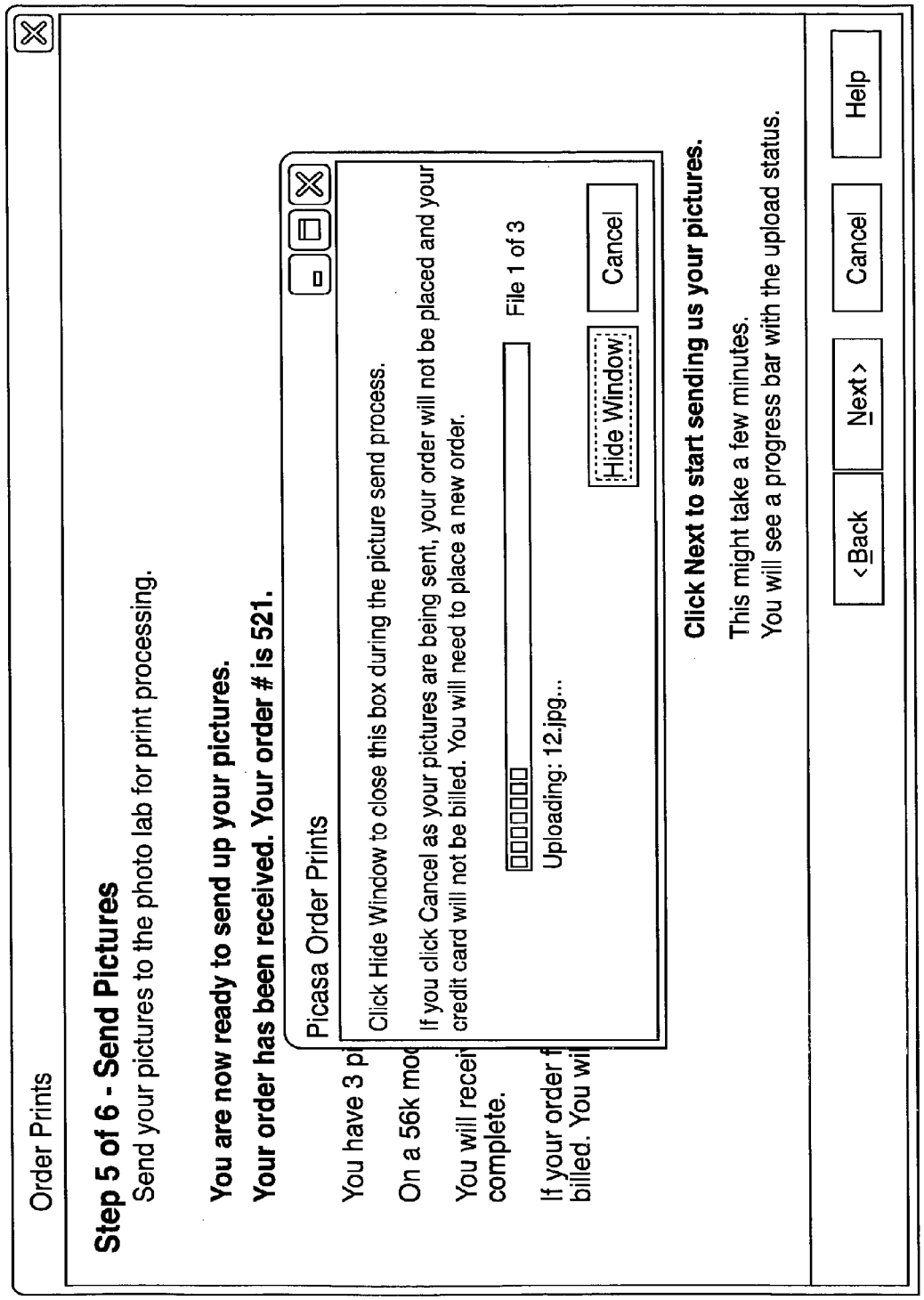
Figure 19:

The Screenshot of FIG. 11 illustrates a dialog box in accordance with the principles of the present invention through which a user may select images to email to one or more recipients. This dialog box would be reached by activating the "Send via Picasa Express™ E-mail" button 1004 of described in the discussion related to FIG. 10. Email addresses for both the "from" 1102 and "to" 1104 address slots may be entered by typing or by selecting from an address book (not shown). The subject 1106, message 1108, and attached 1110 interactive areas allow a user to provide a recipient with indicia of the attached images. In an illustrative embodiment, an image archiving and presentation system in accordance with the principles of the present invention automatically resizes an image to a default setting of 640×480 pixels. Because most displays don't display images at higher resolution, sending reduced-size images reduces uploading and downloading time, without loss of image quality. The resizing function may be enabled or disabled at a user's discretion.

Activating the "Order Prints" button 824 described in the discussion related to FIG. 8 allows a user to order prints of digital image files, such as those archived in a manner previously described. A print-ordering display in accordance with the principles of the present invention is illustrated by the screenshot of FIG. 12. The graphical interface for ordering such prints may be resident on a user's computer, along with a print-ordering browser, such as will be described in the discussion related to FIG. 20. This, opening, screenshot provides a user with general pricing information 1200 that is correlated to size and type of print. Prices for shipping and handling 1202 are also displayed. Pricing information may be downloaded to a users computer on a regular basis, in a background mode, for example whenever a user "goes online." For those users who employ a continuous Internet connection, such as may be provided through a high-speed cable modem, for example, pricing information may be updated continuously. In addition to pricing information, static, or dynamic areas, such as area 1204, may be set aside for advertising.

In this illustrative embodiment, the screenshot of FIG. 13 represents the next step in the print ordering process in accordance with the principles of the present invention. A display area 1300 is set aside for the selection of images and another display area 1302 is set aside for the selection of print type and quantity. Rather than forcing a user to remember a file name or another process that doesn't take advantage of a human's superior facility for remembering imagery, a system in accordance with the principles of the present invention may present the images to be ordered in the display area 1300. Various of the images selected for processing may be scrolled through via the slide bar 1304 or previous 1306 and next 1308 buttons. From which prints are to be made (three images in this illustrative example) may have been loaded for processing through use of the picture tray 816, as described in the discussion related to FIG. 8. Metadata used in the image archiving process may also be used to automatically alert a user as to the desirability of certain processes. In this illustrative example the user is cautioned against ordering larger prints, because the resolution of the original image would limit the quality of the prints. The screen shots of FIGS. 14, 15, 16, 17, 18, and 19 respectively illustrate a billing/shipping address entry screen, a credit card and email confirmation screen, an order review and submission screen, an order launching screen, an order uploading screen, and an order confirmation screen in accordance with the principles of the present invention. In a client/server embodiment, the interface described in relation to the discussion of FIGS. 9 through 19 may be components of a browser resident in a controller, such as the controller 100 (also referred to herein as a computer system 100) described in the discussion related to FIG. 1. In such an embodiment, a server, such as server 130, operates to receive and execute photo processing orders. The server 130 (or a plurality of servers such as server 130) may provide web-accessed photo-processing services to state, national, or international customers. When operated in conjunction with an image archiving and retrieval system as previously described, the browser allows a user to access, review, and order prints of, images in an efficient, natural manner, using the previously described metadata-clustering and graphical metaphor retrieval processes.

Figure 20:
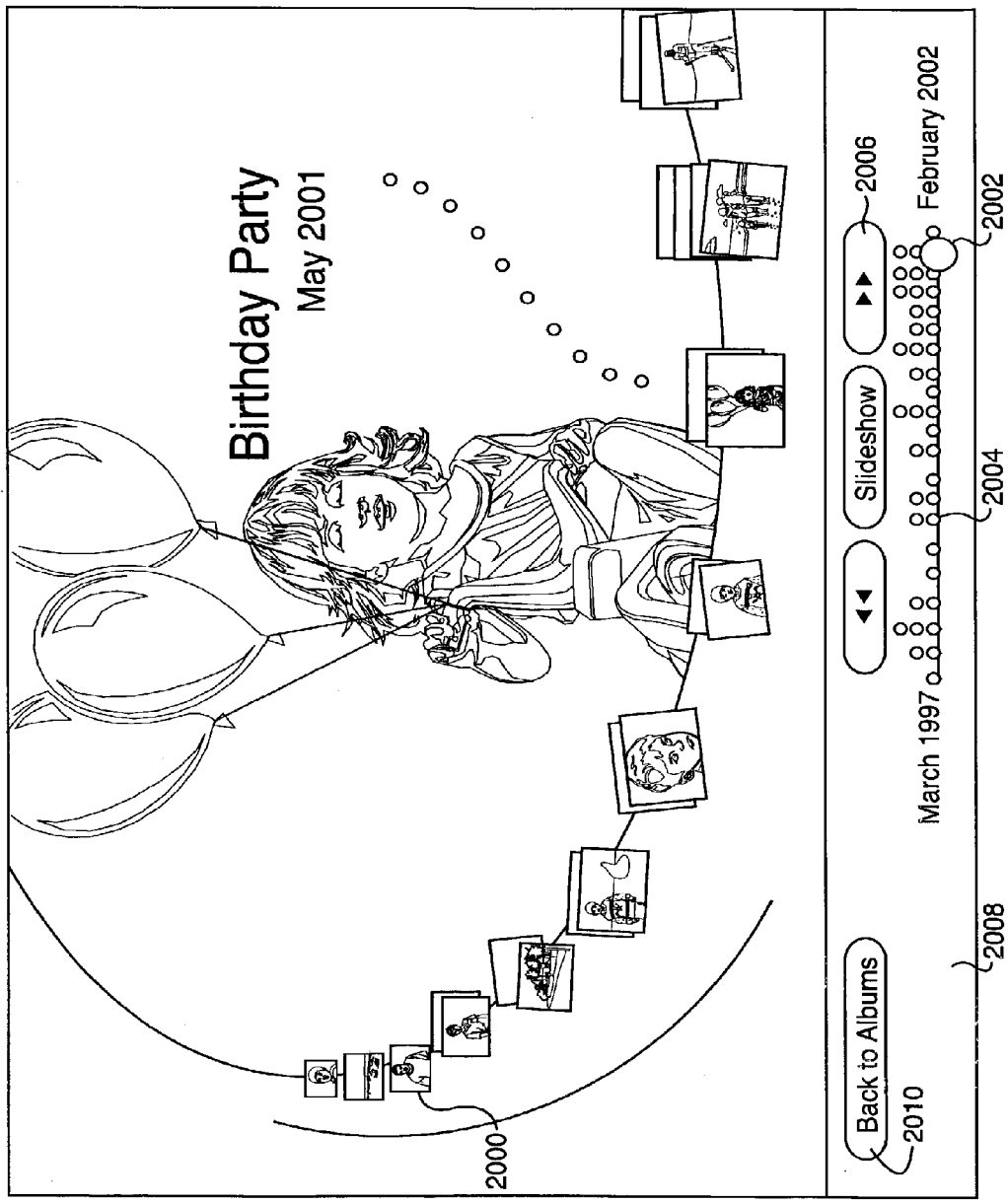
FIG. 20 is a detailed screenshot of the use of a timeline metaphor in combination with a time-based scrubber used to access archived images in accordance with the principles of the present invention.

The screenshot of FIG. 20 provides a more detailed view of the use of a timeline metaphor for accessing and displaying archived images in accordance with the principles of the present invention. Representative images from photo albums are distributed along a timeline 2000. A user may employ an interactive device, such as a mouse, to move along the timeline, thereby searching through time for images of interest, Moving the slide 2002 may also shift the timeline 2002. The scrubber 2004 indicates the number of image albums associated with various time periods within the displayed range (March 1997 to February 2002 in this example). Clicking on an image album initiates a slide show of the images within the album. A user may navigate among the slides within an album by manipulating the forward 2006 and backward 2008 buttons. A button 2010 allows a user to toggle between timeline and slideshow views.

In this illustrative embodiment collections are displayed on a graphical metaphor that provides additional cues or information to facilitate the user's memory. Graphical metaphors may include a timeline, a map, family tree, a route plotted on a map, or other mnemonic classifying devices. Various combinations of graphical metaphors are also contemplated within the scope of the invention, for example, timeline and map metaphors may be combined. A timeline may be used to display and access images according to one or more dates associated with the image. The one or more dates may be the date that the image was first captured or the date the image was archived, for example. A map metaphor may be used to associated images with the geographical location of the image's location. A combination metaphor may superimpose one or more timelines on map locations to allow a user to, for example, conduct a graphical search for images taken within a specific range of time in various locations; Winter in Tahiti, Summer in Colorado, for example. A user, searching for a specific image, may employ one or more steps of isolating a small group of collections, then a specific collection, then the specific image within the collection. Individual images (or collections), again, based on metadata, may be presented in a manner to further communicate information about the image (or collections) or about the relationships between images (or collections).

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter connected to the network over a medium. Medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A method comprising:

receiving, using one or more processors, at least one image;

acquiring, using the one or more processors, metadata associated with the at least one image, the metadata including location information for the at least one image;

clustering, using the one or more processors, the at least one image into a plurality of image clusters, wherein each image cluster is associated with a geographic location based on the location information; and causing, using the one or more processors, the plurality of image clusters to be displayed on a map, wherein each image cluster is displayed on the map according to the geographic location associated with the image cluster, and wherein each image cluster of the plurality of image clusters includes a portion of the metadata associated with that image cluster and wherein the plurality of image clusters and corresponding metadata portions are displayed so as to be visible simultaneously.

2. The method of claim 1, further comprising causing a descriptive label associated with the at least one image to be displayed with each image cluster.

3. The method of claim 1, wherein the clustering is based on a selectable map scale level and new clusters are generated based on changes in temporal and location clustering parameters resulting from a change in the map scale level.

4. The method of claim 1, wherein the clustering further includes clustering the at least one image based on temporal data and location information.

5. The method of claim 1, wherein the location information is obtained from a location system coupled to an imaging device.

6. The method of claim 5, wherein the location system includes a global positioning system.

7. The method of claim 1, wherein the map includes an icon associated with each image cluster and a line drawn from each icon to a location on the map corresponding to a map location of the associated image cluster.

8. The method of claim 1, wherein the geographic location includes a distance range from a geographic point.

9. The method claim 1, wherein the clustering includes clustering the at least one image based on an event, wherein the event includes temporal data and location information.

10. The method of claim 9, wherein the event includes temporal data having a plurality of different times and location information associated with a single geographic location.

11. The method of claim 9, wherein the event includes temporal data having a plurality of different times and location information representing a plurality of different geographic locations.

12. The method of claim 9, wherein the event includes temporal data associated with a single time range and location information associated with a single geographic location.

13. The method of claim 9, wherein the event includes temporal data associated with a single time range and location information representing a plurality of different geographic locations.

14. The method of claim 1, further comprising causing, using the one or more processors, images in an image cluster to be displayed when the image cluster is selected for viewing.

15. The method of claim 1, wherein the location information represents a location of a subject of the at least one image.

16. The method of claim 1, wherein the location information represents a location of an imaging device capturing the at least one image.

17. A system comprising:
a processor; and
a data storage device coupled to the processor, the data storage device bearing software instructions that, when executed by the processor, cause the processor to perform operations including:
clustering at least one image into one or more image clusters, wherein each image cluster is associated with a geographic location; and
causing the one or more image clusters to be simultaneously displayed on a map, wherein each image cluster includes a portion of the metadata associated with that image cluster and wherein the one or more image clusters and corresponding metadata portions are displayed so as to be visible simultaneously, and wherein each image cluster is displayed on the map according to the geographic location associated with the image cluster.

18. The system of claim 17, wherein the clustering is based on a selectable map scale level and the clustering is updated in response to a change in the map scale level.

19. A nontransitory computer readable medium having stored therein software instructions that, when executed by a processor, cause the processor to perform operations comprising:
receiving at least one image;
acquiring metadata associated with the at least one image, the metadata including location information for the at least one image;
clustering the at least one image into one or more image clusters, wherein each image cluster is associated with a geographic location based on the location information; and
causing the one or more image clusters to be displayed on a map, wherein each image cluster includes a portion of the metadata associated with that image cluster and wherein the one or more image clusters and corresponding metadata portions are displayed so as to be visible simultaneously, and wherein each image cluster is displayed on the map according to the geographic location associated with image cluster, and wherein a portion of metadata associated with each image cluster is simultaneously displayed on the map with the associated image cluster.

20. The method of claim 1, wherein the portion of metadata includes a time range.

21. The method of claim 2, wherein the descriptive label includes an event name.

22. The method of claim 1, wherein the portion of metadata includes an image count.

23. The system of claim 17, wherein the portion of metadata includes a time range.

24. The system of claim 17, wherein the portion of metadata includes an event name.

25. The system of claim 17, wherein the portion of metadata includes an image count.

26. The nontransitory computer readable medium of claim 19, wherein the portion of metadata includes a time range.

27. The nontransitory computer readable medium of claim 19, wherein the includes an event name.

28. The nontransitory computer readable medium of claim 19, wherein the portion of metadata includes an image count.

* * * * *